(12) United States Patent
Wheeler et al.

(10) Patent No.: US 12,338,918 B2
(45) Date of Patent: Jun. 24, 2025

(54) ROLL END AIR FITTING ADAPTER AND METHOD OF USING SAME

(71) Applicant: Enercon Industries Corporation, Menomonee Falls, WI (US)

(72) Inventors: Craig Anthony Wheeler, Mequon, WI (US); Jacob William Hanson, Menomonee Falls, WI (US)

(73) Assignee: ENERCON INDUSTRIES CORPORATION, Menomonee Falls, WI (US)

( * ) Notice: Subject to any disclaimer, the term of this patent is extended or adjusted under 35 U.S.C. 154(b) by 140 days.

(21) Appl. No.: 18/312,963

(22) Filed: May 5, 2023

(65) Prior Publication Data
US 2024/0369163 A1 Nov. 7, 2024

(51) Int. Cl.
*F16L 19/02* (2006.01)
*B29C 59/14* (2006.01)
*D21H 25/04* (2006.01)

(52) U.S. Cl.
CPC .......... *F16L 19/0206* (2013.01); *B29C 59/14* (2013.01); *D21H 25/04* (2013.01)

(58) Field of Classification Search
CPC ...... F16L 19/0206; B29C 59/14; B29C 63/18; B29C 63/10; B29C 59/10; B29C 59/106; B29C 2059/145; B29C 59/12; D21H 25/04; D21H 23/22; H01T 19/00; B41M 5/0011; H01R 43/22; H02G 1/085; Y10T 29/53909; Y10T 29/53283; Y10T 29/53213; Y10T 29/49547; Y10T 29/49558;
(Continued)

(56) References Cited

U.S. PATENT DOCUMENTS 5,072,504 A * 12/1991 Thompson ............ B41F 27/105
                                                         29/895.23
6,429,595 B1    8/2002 Hammen et al.
(Continued)

FOREIGN PATENT DOCUMENTS

JP     2002067154 A     3/2002

OTHER PUBLICATIONS

Extended European Search Report dated Sep. 30, 2024 issued in European Application No. 24172614.0. (9 pages).
(Continued)

*Primary Examiner* — Xiuyu Tai
(74) *Attorney, Agent, or Firm* — KLINTWORTH & ROZENBLAT LLP

(57) ABSTRACT

A roll end air fitting adapter is couplable to an end of a cylindrical roll. The adapter includes an inner ring and outer ring defining a central opening concentric with a roll axis, an annular air channel extending about the roll axis, and a plurality of air passages leading from the air channel through the inner ring and/or the outer ring to peripheral outlet openings in an outer circumferential surface(s) of the inner ring and/or the outer ring. A compliant sleeve is disposed along the roll axis with the peripheral outlet openings between the end of the compliant sleeve and the outer ring so that the compliant sleeve overlaps the peripheral outlet openings. Supplying air to the adapter ring by the air source to force air through the air channel and the peripheral outlet openings facilitates sliding the compliant sleeve onto the cylindrical roll.

20 Claims, 8 Drawing Sheets

(58) Field of Classification Search
CPC ........... Y10T 29/49824; Y10T 29/4987; Y10T 29/49908; C23C 16/545; D06B 23/18; D06B 19/00; B41F 27/105; B23P 11/022
See application file for complete search history.

(56) References Cited

U.S. PATENT DOCUMENTS

| | | | |
|---|---|---|---|
| 6,789,479 B2 * | 9/2004 | Gottling | B41F 27/105 101/479 |
| 8,709,351 B2 | 4/2014 | Hammen et al. | |
| 2003/0015280 A1 | 1/2003 | Pham | |
| 2008/0173196 A1 * | 7/2008 | Iwamoto | B41N 7/00 29/428 |
| 2012/0312181 A1 * | 12/2012 | Doucet | B41F 30/04 101/479 |

OTHER PUBLICATIONS

Jemmco, LLC—EZ Sleeve Roller, Product Details at https://www.jemmco.com/ez-sleeve-roller, 2023. (2 pages).

* cited by examiner

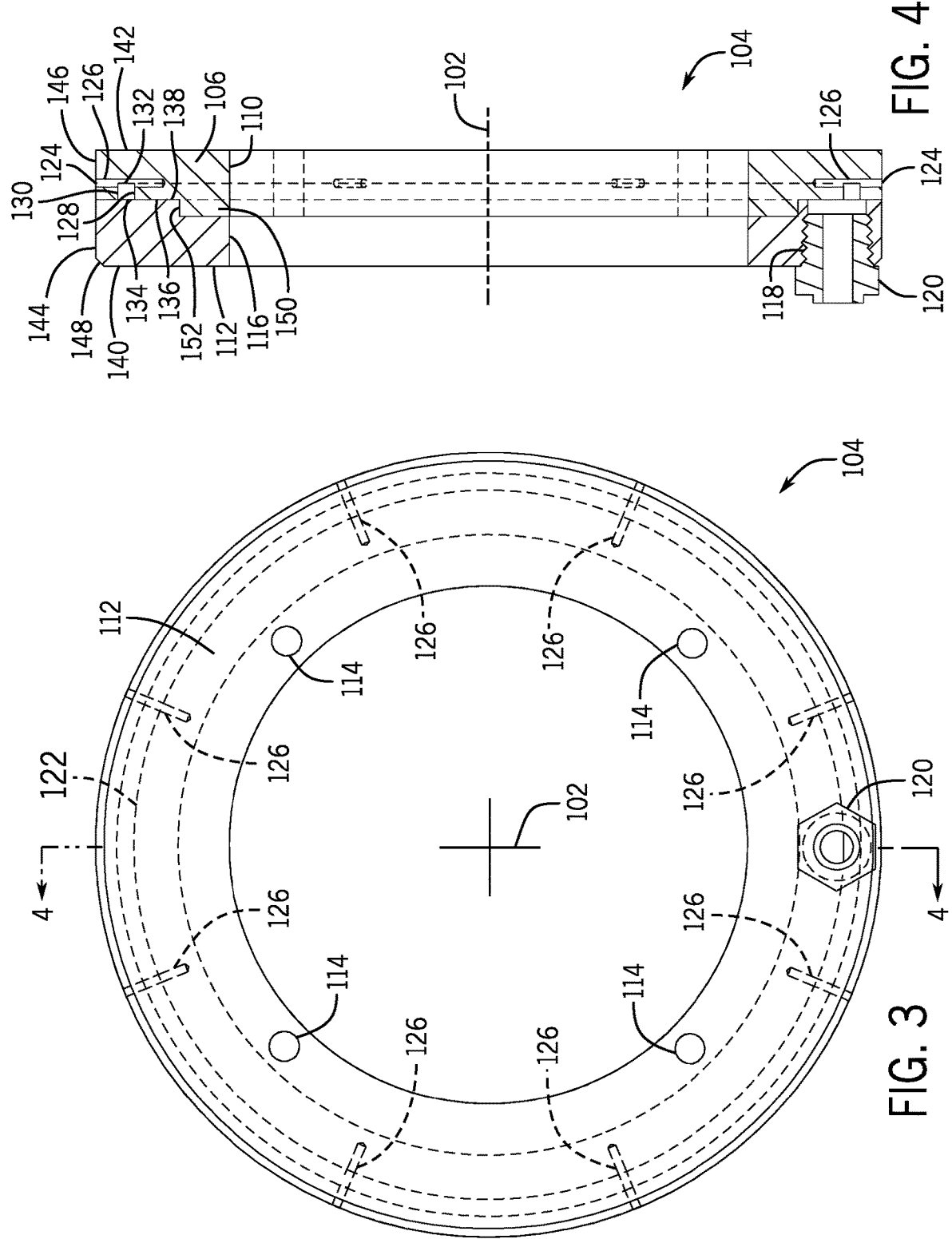

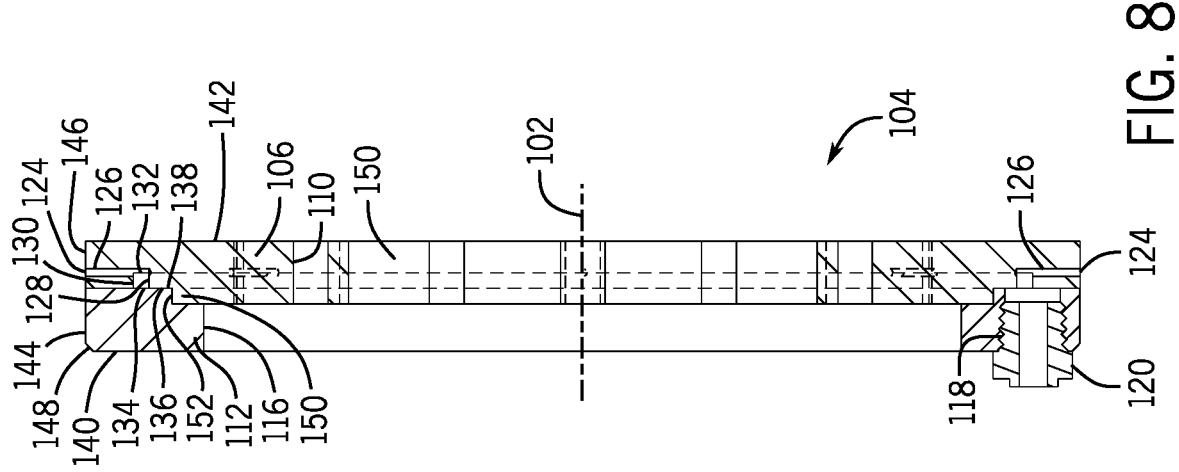
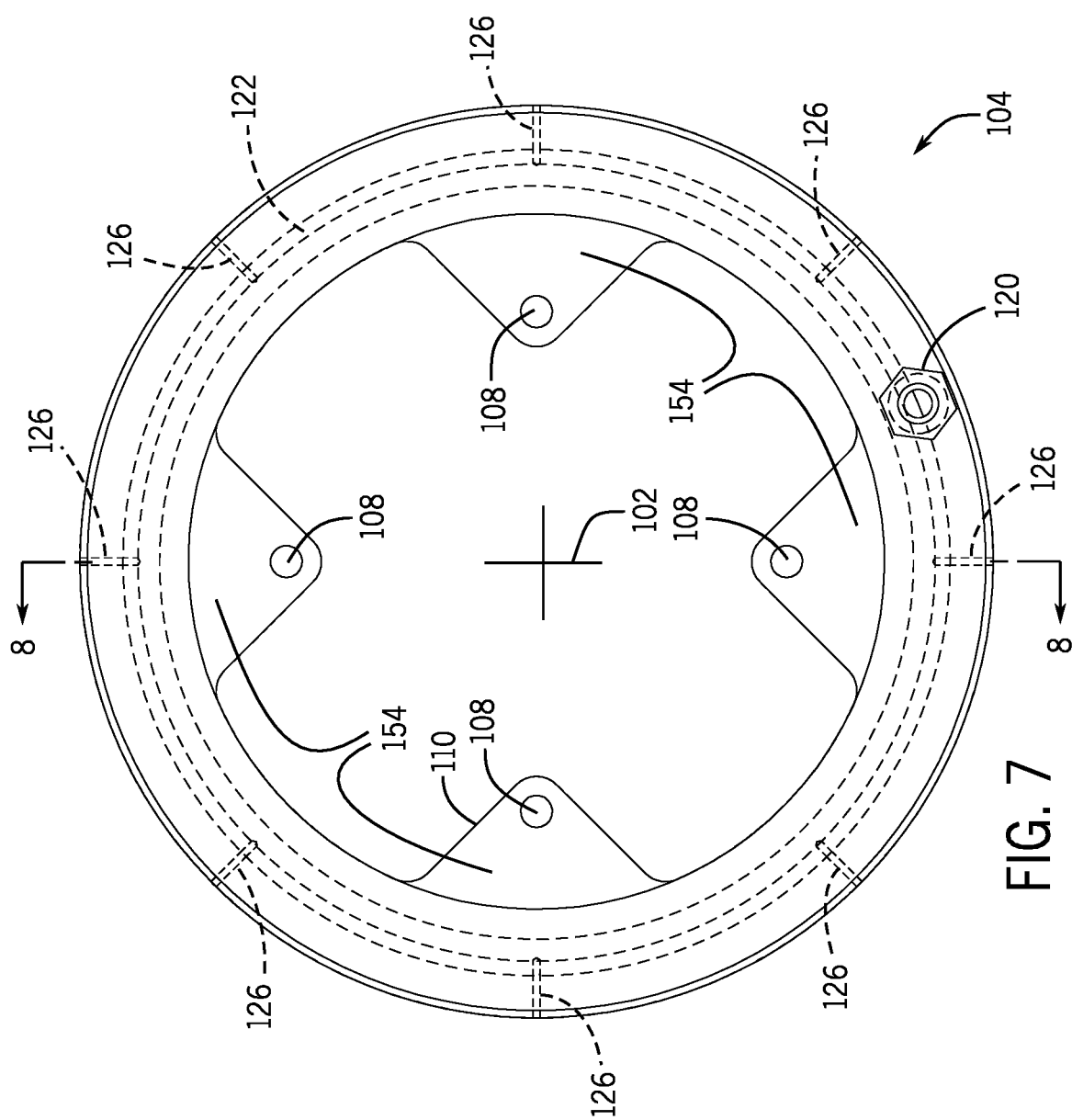
FIG. 7
FIG. 8

ROLL END AIR FITTING ADAPTER AND METHOD OF USING SAME

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

The invention generally relates to applying compliant sleeves to cylindrical rolls, such as dielectric sleeves applied to active electrode rolls used in systems for treating the surfaces of materials to enhance the surface characteristics of the materials.

BACKGROUND OF THE DISCLOSURE

Certain industrial processes require a compliant sleeve to be applied over the outer circumference of a cylindrical roll. An example of one such industrial process can be found in the corona or plasma treatment of materials, such as paper, polymer webs and various films often used in printing, coating and laminating applications. In such processes, a corona or plasma discharge is generated by a high-voltage AC to bombard the material with ions and thereby raise its surface tension to improve the bonding of adhesives and inks. Large-scale operations feed web material from rolls at a high rate through the corona or plasma discharge as part of an assembly or other process line. The web material can be supported by a backing roll that is spaced from an active electrode roll. A high-voltage AC power supply is connected across the backing and active electrode rolls to produce the corona or plasma discharge through which the web material passes. To achieve a proper or corona or plasma discharge the active electrode roll can be covered with a dielectric material. This dielectric material comes in the form of a compliant, open-ended cylindrical sleeve that must be slid onto the active electrode roll and fit tightly onto the active electrode roll during the surface treatment operation. Due to the close sizing of inner diameter of the dielectric sleeve and the outer diameter of the active electrode roll as well as the sliding friction generated between the sleeve and the roll, it is difficult to slide the sleeve onto the roll.

SUMMARY OF THE DISCLOSURE

The disclosure provides an apparatus and method using a roll end air fitting adapter to facilitate applying a compliant sleeve onto a cylindrical roll such as a dielectric layer of a roller electrode in a surface treater station.

In one aspect, the disclosure provides a roll end air fitting adapter mechanically couplable to an open end of a cylindrical roll extending along a roll axis. The adapter has an adapter ring. The adapter ring includes an inner ring having a bolt hole pattern receiving fasteners mounting the adapter to the cylindrical roll and defining a central opening concentric with the roll axis when the adapter ring is mounted to the cylindrical roll. The adapter ring also includes an outer ring coupled to or formed with the inner ring. The inner ring or the outer ring defines, or the inner ring and the outer ring define, an annular air channel extending about the roll axis. The air channel is intersected by a plurality of air passages leading from the air channel through the inner ring, the outer ring or the inner ring and the outer ring to a plurality of peripheral outlet openings disposed at an outer circumferential surface of the inner ring or the outer ring, or at the outer circumferential surfaces of the inner ring and the outer ring. A fitting for coupling an air source to the adapter ring may be received in a port of the outer ring that communicates with the air channel. Upon fitting a compliant sleeve onto the adapter ring when the adapter ring is mounted to the cylindrical roll such that an end of the compliant sleeve is disposed along the roll axis with the peripheral outlet openings between the end of the compliant sleeve and the outer ring so that the compliant sleeve overlaps the peripheral outlet openings, and supplying air to the adapter ring by the air source to force air through the air channel and the peripheral outlet openings, the adapter ring facilitates sliding the compliant sleeve onto the cylindrical roll.

In other aspects, the air channel extends 360 degrees about the roll axis when the adapter ring is mounted to the cylindrical roll. The plurality of peripheral outlet openings includes four or more peripheral outlet openings spaced apart 90 degrees along the outer circumferential surface of the inner ring or the outer ring or the outer circumferential surfaces of the inner ring and the outer ring. In some cases, the plurality of peripheral outlet openings includes eight peripheral outlet openings spaced apart 45 degrees along the outer circumferential surface of the inner ring or the outer ring or the outer circumferential surfaces of the inner ring and the outer ring.

In other aspects, the inner ring defines the air channel, the plurality of air passages and the plurality of peripheral outlet openings. The inner ring also defines concentric circular walls and an annular inner wall spanning the concentric circular walls of the air channel. The outer ring is a separate ring that couples to the inner ring to define an annular outer wall of the air channel spanning the concentric circular walls.

In other aspects, the outer ring has a central opening and a bolt hole pattern aligned with the central opening and the bolt hole pattern of the inner ring. The bolt hole pattern of the outer ring receives the fasteners mounting the adapter to the cylindrical roll. A shaft projects along the roll axis beyond the outer ring. A shaft bearing mounting the shaft to the cylindrical roll is disposed within the central openings of the inner ring and the outer ring. The shaft and shaft bearing facilitate rotation of the cylindrical roll about the roll axis and the adapter ring co-rotates with the cylindrical roll.

In certain embodiments, the cylindrical roll is a roller electrode of an ionization surface treater station, and the compliant sleeve is a cylindrical sleeve of dialectic material.

Another aspect of the disclosure provides a method of using a roll end air fitting adapter with a cylindrical roll extending along a roll axis. The method includes mounting an adapter ring to an open end of the cylindrical roll. The adapter ring has: an inner ring having a bolt hole pattern receiving fasteners mounting the adapter ring to the cylindrical roll and defining a central opening concentric with the roll axis when the adapter ring is mounted to the cylindrical roll; and an outer ring coupled to or formed with the inner ring. The inner ring or the outer ring defines, or the inner ring and the outer ring define, an annular air channel extending about the roll axis. The air channel is intersected by a plurality of air passages leading from the air channel through the inner ring, the outer ring or the inner ring and the outer ring to a plurality of peripheral outlet openings disposed at an outer circumferential surface of the inner ring or the outer ring, or at the outer circumferential surfaces of the inner ring and the outer ring. The method includes connecting an air source to a fitting that is mounted to the adapter ring and communicates with the air channel. The method also includes applying a compliant sleeve onto the adapter ring such that an end of the compliant sleeve is disposed along the roll axis with the peripheral outlet openings between the end of the compliant sleeve and the outer ring so that the compliant sleeve overlaps the peripheral outlet openings; supplying air to the adapter ring by the air source to force air through the air channel and out the peripheral outlet openings. And the method further includes sliding the compliant sleeve along the cylindrical roll while air is supplied to the adapter ring.

In other aspects, the air channel extends 360 degrees about the roll axis when the adapter ring is mounted to the cylindrical roll. The plurality of peripheral outlet openings includes four or more peripheral outlet openings spaced apart 90 degrees along the outer circumferential surface of the inner ring or the outer ring or the outer circumferential surfaces of the inner ring and the outer ring. In some cases, the plurality of peripheral outlet openings includes eight peripheral outlet openings spaced apart 45 degrees along the outer circumferential surface of the inner ring or the outer ring or the outer circumferential surfaces of the inner ring and the outer ring.

In other aspects, the inner ring defines the air channel, the plurality of air passages and the plurality of peripheral outlet openings. The inner ring also defines concentric circular walls and an annular inner wall spanning the concentric circular walls of the air channel. The outer ring is a separate ring that couples to the inner ring to define an annular outer wall of the air channel spanning the concentric circular walls.

In other aspects, the outer ring has a central opening and a bolt hole pattern aligned with the central opening and the bolt hole pattern of the inner ring. The bolt hole pattern of the outer ring receives the fasteners mounting the adapter to the cylindrical roll. The method further includes: terminating the air source from the air source after a full length of the compliant sleeve has been extended along the cylindrical roll; disconnecting the air source form the adapter ring; supporting the cylindrical roll by a shaft projecting along the roll axis through the central openings of the inner ring and the outer ring beyond the adapter ring and a shaft bearing mounting the shaft to a header of the cylindrical roll; and orienting the cylindrical roll in an upright position with the adapter ring at an upper end of the cylindrical roll before sliding the compliant sleeve along the cylindrical roll while air is supplied to the adapter ring. The shaft and shaft bearing facilitate rotation of the cylindrical roll about the roll axis and wherein the adapter ring co-rotates with the cylindrical roll.

In certain embodiments, the method applies to a cylindrical roll that is a roller electrode of an ionization surface treater station in which the compliant sleeve is a cylindrical sleeve of dialectic material.

The details of one or more embodiments are set forth in the accompanying drawings and the description below. Other features and advantages will become apparent from the description, the drawings, and the claims.

BRIEF DESCRIPTION OF THE DRAWINGS

FIG. 3 is a rear elevation view thereof;

FIG. 4 is a side cross-sectional view thereof taken along line 4-4 of FIG. 3;

FIG. 7 is a rear elevation view thereof;

FIG. 8 is a side cross-sectional view thereof taken along line 8-8 of FIG. 7;

Like reference symbols in the various drawings indicate like elements.

DETAILED DESCRIPTION

Figure 1:
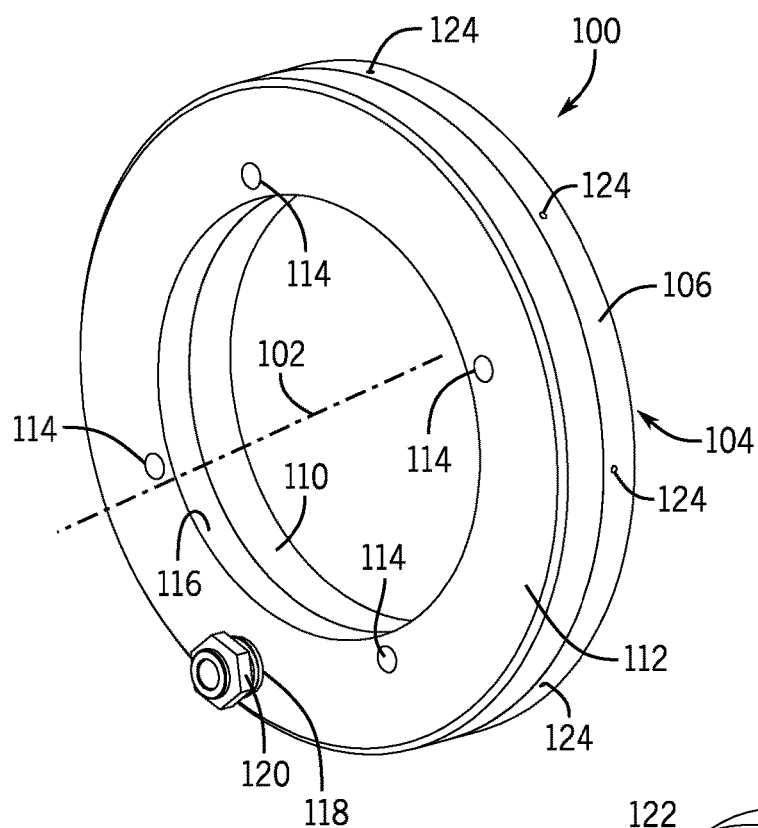
FIG. 1 is an isometric view of a roll end air fitting adapter in accordance with an example embodiment of the present disclosure.

Embodiments of the present disclosure are shown in the accompanying figures of the drawings described briefly above. Various modifications to the example embodiments may be contemplated by one of skill in the art, without departing from the scope of the present invention, as set forth in the appended claims.

Overview

The present disclosure relates to applying a compliant sleeve to a cylindrical roll as may be required to perform various industrial processes. In some applications, the compliant sleeve must fit tightly around the cylindrical roll to perform properly during operation of the industrial process. In such applications, the close-fit of the compliant sleeve makes it difficult to fit onto the cylindrical roll due to the similar diameter of the inner diameter of the sleeve and the outer diameter of the cylindrical roll. In addition to the sizing of the cylindrical sleeve, the compliant sleeve may encounter sliding friction forces that resist sliding the sleeve onto the cylindrical role. As such, the compliant sleeve may need to be expanded or stretched prior to or as the sleeve is fit onto the cylindrical roll. One way to expand the compliant sleeve is by the use of compressed air. However, it may be cumbersome or difficult to properly interface a compressed air line properly with the compliant sleeve or the cylindrical roll as the sleeve is slid onto the roll.

This disclosure provides a roll end air fitting adapter to facilitate applying a compliant sleeve onto a cylindrical roll. In various embodiments, the adapter may have an adapter ring that bolts onto the cylindrical roll. The adapter ring has a fitting for an air line (e.g., a hose) to couple a compressed air source to the cylindrical roll. Internal passages within the adapter ring communicate the compressed air from the air source through the air fitting, through internal passages to small outlet openings at the outer periphery or circumference of the adapter ring.

With the adapter ring mounted to the end of the cylindrical roll, the compliant sleeve may be fit onto the adapter ring such that an end of the compliant sleeve overlaps the peripheral outlet openings. By supplying air to the adapter ring from the air source, air will pass through the adapter ring and exit the peripheral outlet openings. The resulting air flow encircles the cylindrical roll and expands the compliant sleeve so that a thin cylindrical air curtain envelops the outer circumference of the cylindrical roll. This facilitates sliding the compliant sleeve down along the length of the cylindrical roll.

The adapter ring may be formed as a single monolithic part, such as by casting or additive manufacturing (e.g., 3-D printing). In other embodiments, the adapter ring may be formed as an assembly of multipole discrete parts. In either case, the adapter ring may have and inner ring (or inner ring portion) and an outer ring (or outer ring portion).

In some embodiments, the inner ring may have a bolt hole pattern receiving fasteners mounting the adapter to the cylindrical roll and defining a central opening concentric with a roll axis of the cylindrical roll when the adapter ring is mounted to the cylindrical roll. The inner ring or the outer ring defines, or the inner ring and the outer ring define, an annular air channel extending about the roll axis. The air channel is intersected by a plurality of air passages leading from the air channel through the inner ring, the outer ring or the inner ring and the outer ring to the plurality of peripheral outlet openings disposed at an outer circumferential surface of the inner ring or the outer ring, or at the outer circumferential surfaces of the inner ring and the outer ring. The air line fitting ay be received in a port of the outer ring that communicates with the air channel.

In some embodiments, the inner ring defines the air channel, the plurality of air passages and the plurality of peripheral outlet openings. The inner ring also defines concentric circular walls and an annular inner wall spanning the concentric circular walls of the air channel. The outer ring is a separate ring that couples to the inner ring to define an annular outer wall of the air channel spanning the concentric circular walls. The adapter ring may define the air channel so that it extends partially (less then 360 degrees) or fully (360 degrees) about the roll axis when the adapter ring is mounted to the cylindrical roll. The plurality of peripheral outlet openings includes four or more peripheral outlet openings spaced apart 90 degrees along the outer circumferential surface of the inner ring or the outer ring or the outer circumferential surfaces of the inner ring and the outer ring. In some cases, the plurality of peripheral outlet openings includes eight peripheral outlet openings spaced apart 45 degrees along the outer circumferential surface of the inner ring or the outer ring or the outer circumferential surfaces of the inner ring and the outer ring.

In other aspects, the outer ring has a central opening and a bolt hole pattern aligned with the central opening and the bolt hole pattern of the inner ring. The bolt hole pattern of the outer ring receives the fasteners mounting the adapter to the cylindrical roll. A shaft projects along the roll axis beyond the outer ring. A shaft bearing mounting the shaft to the cylindrical roll is disposed within the central openings of the inner ring and the outer ring. The shaft and shaft bearing facilitate rotation of the cylindrical roll about the roll axis and the adapter ring co-rotates with the cylindrical roll. Various adapter rings may be sized as needed to fit different diameter cylindrical rolls.

Another aspect of the disclosure provides a method of using a roll end air fitting adapter with a cylindrical roll. The method includes mounting an adapter ring to an open end of the cylindrical roll, and applying a compliant sleeve onto the adapter ring such that an end of the compliant sleeve is disposed along the roll axis with the peripheral outlet openings between the end of the compliant sleeve and the outer ring so that the compliant sleeve overlaps the peripheral outlet openings. By supplying air to the adapter ring by the air source to force air through the air channel and out the peripheral outlet openings. The method further includes sliding the compliant sleeve along the cylindrical roll while air is supplied to the adapter ring.

One example of an industrial process that utilizes a compliant sleeve fit that is tightly fit onto a cylindrical roll is the surface treatment of materials by ionization. Although the following describes the present disclosure in the context of a surface treatment application, it will be understood by those skilled in the art that other industrial processes may utilize and benefit from this disclosure. In the surface treatment application, the cylindrical roll is a roller electrode of an ionization surface treater station (e.g., as a corona, chemical corona, or plasma discharge treater), and the compliant sleeve is a cylindrical sleeve of dialectic material, typically a type of polymer (e.g., silicone, epoxy, and the like).

Example Roll End Air Fitting Adapter(s)

Figure 2:
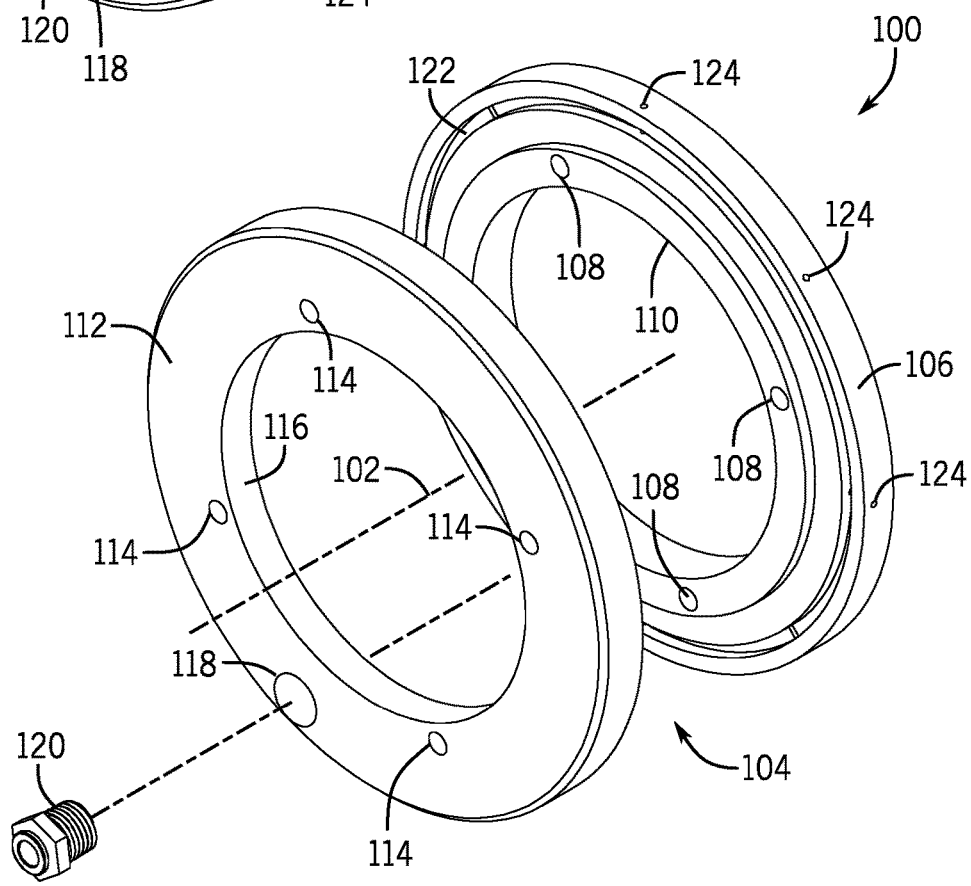
FIG. 2 is an exploded view thereof.
Figure 5:
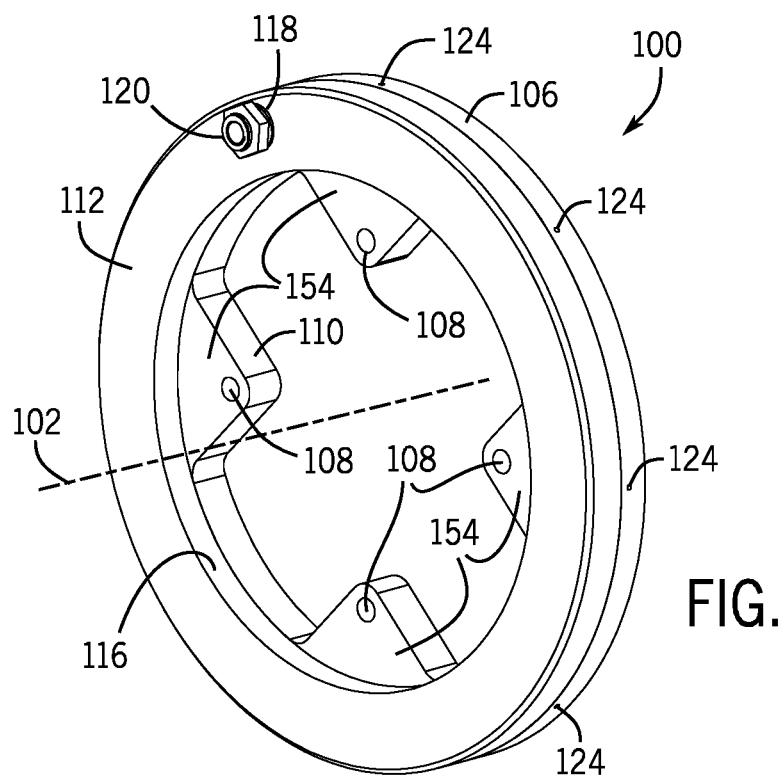
FIG. 5 is an isometric view of a roll end air fitting adapter in accordance with another example embodiment.
Figure 6:
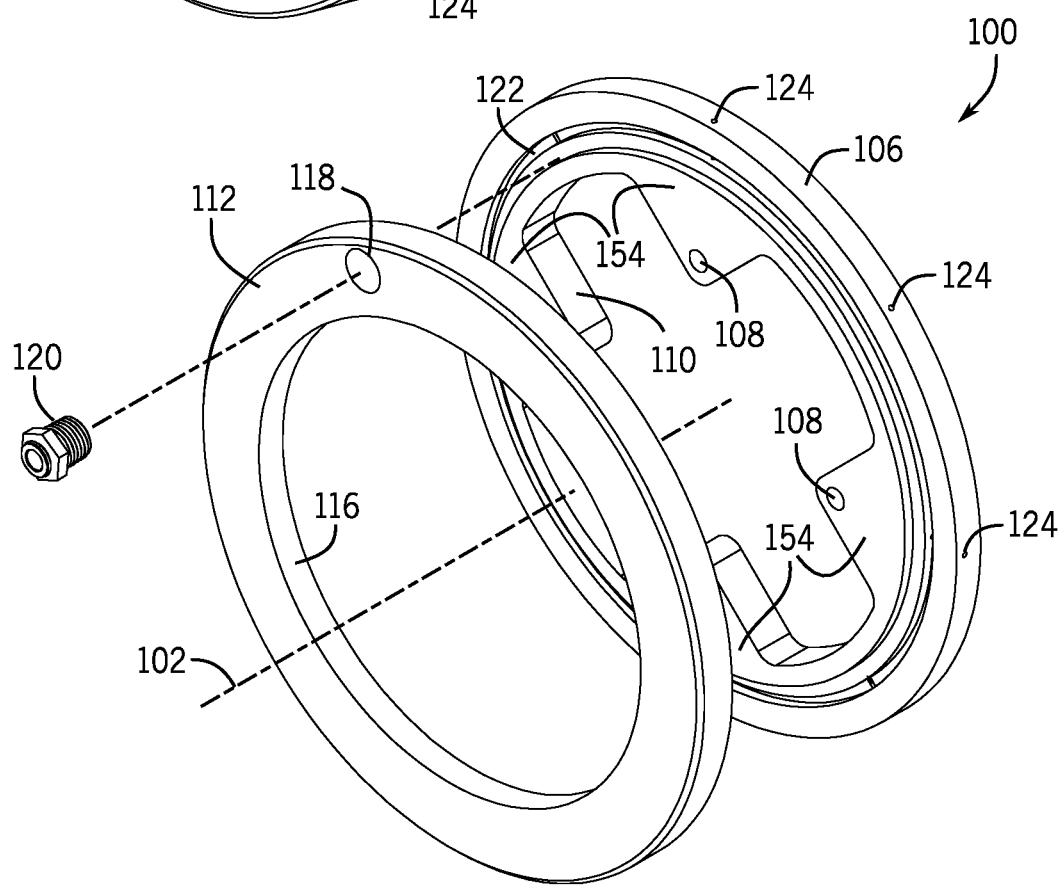
FIG. 6 is an exploded view thereof.
Figure 9:
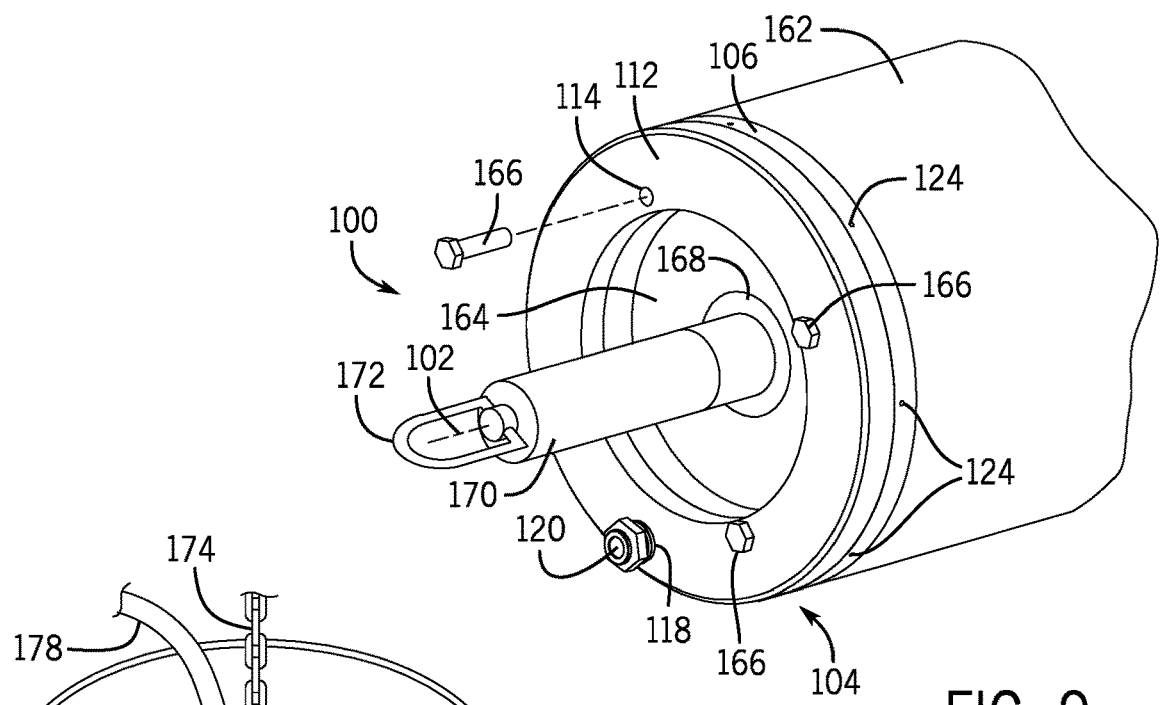
FIGS. 9-14 are partial isometric views depicting steps in an example method of using the roll end air fitting adapter to apply a compliant sleeve to a cylindrical roll in accordance with an embodiment of the present disclosure.

Referring to FIGS. 1 and 2, an example roll end air fitting adapter 100 may be understood with respect to an axis 102 about which various features are cylindrical or symmetric and about which a cylindrical roll, to which the roll end air fitting adapter 100 secures, is configured to rotate.

The example roll end air fitting adapter 100 includes an adapter ring 104 including an inner ring 106 that has a circular shape about the axis 102 but may have non-circular features formed thereon. The inner ring 106 defines a bolt hole pattern having a plurality of bolt holes 108, such as two, four, six, or more bolt holes 108. The bolt holes 108 may be distributed at uniform or non-uniform angular spacings about the axis 102. In the illustrated embodiment, there are four bolt holes 108 distributed 90 degrees from one another. In other embodiments, there may be eight bolt holes 108 distributed 45 degrees from one another. Other arrangements may also be used.

The inner ring 106 defines a central opening 110. As described in greater detail below with respect to FIGS. 9-14, the central opening 110 may provide access to a cylindrical roll to which the roll end adapter is secured, and structures secured to the cylindrical roll may protrude out of the central opening 110. The central opening 110 may therefore have a symmetric or non-symmetric shape about the axis 102 provided the opening 110 provides appropriate clearances for use with the cylindrical roll.

The adapter ring 104 further includes an outer ring 112 that secures to the inner ring 106. For example, the outer ring 112 may define bolt holes 114 that conform to the radial (distance from the axis 102) and angular distribution of the bolt hole pattern formed by the bolt holes 108. The bolt holes 108 may define multiple bolt hole patterns for securing to multiple types of cylindrical rolls. Fasteners passing through the bolt holes 108, 114 may serve to both secure the adapter ring 104 to the cylindrical roll and secure the inner and outer rings 106, 112 to one another. Alternatively, the inner and outer rings 106, 112 may be secured to one another by separate fasteners, press fit, welds, adhesive, or other type of fasteners. In other embodiments, the inner and outer rings 106, 112 may co-formed, such as in a casting, molding, or additive manufacturing process, so as to be two separate pieces or one monolithic component.

The outer ring 112 defines a central opening 116. The central opening 116 may be identical, within manufacturing tolerances, to the central opening 110 or may have a different size and/or shape about the axis 102. The central opening 116 may be sized and shaped to provide appropriate clearances for use with the cylindrical roll as described above with respect to the opening 110. The outer ring 112 defines a port 118 for receiving a fitting 120, such as a pneumatic fitting for coupling to a pneumatic hose supplying pressurized gas. Alternatively, a pneumatic hose may connect directly to the port 118, such as by engaging threads formed in the port 118. The port 118 is in fluid communication with an air channel 122 formed between the inner ring 106 and outer ring 112. In the illustrated embodiment, the air channel 122 is formed by a circumferential groove in the inner ring 106 and a surface of the outer ring 112 positioned over the groove. However, other arrangements are possible, such as a groove formed in the outer ring 112 or grooves formed in both the inner ring 106 and outer ring 112 that are aligned with one another to form the air channel 122. The air channel 122 may for a complete, i.e., 360 degree, or partial circle about the axis 102.

Peripheral outer openings 124 at the outer circumferential surface of one or both of the inner ring 106 and outer ring 112 are in fluid communication with the air channel 122 such that pressurized air received through the port 118 will be distributed by the air channel 122 to the peripheral outer openings 124. In the illustrated example, the peripheral outer openings 124 are provided in the inner ring 106 only.

Referring to FIGS. 3 and 4, air passages 126 extend radially inwardly from the peripheral outer openings 124 and intersect the air channel 122. In some embodiments the air channel 122 is formed by two cylindrical walls 128, 130 defined about the axis 102 and offset radially from one another. In the illustrated embodiment, the cylindrical walls 128, 130 are defined by the inner ring 106 only. However, in other embodiments, the cylindrical walls 128, 130 are defined by the outer ring 112 or both the inner ring 106 and the outer ring 112.

Annular walls 132, 134 extend across between the cylindrical walls 128, 130 such that the cylindrical walls 128, 130 and annular walls 132, 134 generally define a square toroid. The annular walls 132, 134 may be axial surfaces that are perpendicular to the axis 102 or may have a conical or other shape. The annular wall 132 may be defined by the inner ring 106 and the annular wall 134 defined by the outer ring 112. For example, the annular wall 132 may be the floor of a square toroidal groove formed in the inner ring 106, with the cylindrical wall 128, 130 being the sides of the toroidal groove. The annular wall 134 may be defined by the outer ring 112, such as by a wall surface 136 on the outer ring 112 that engages a corresponding wall surface 138 on the inner ring 106. The wall surfaces 136, 138 may be axial surfaces that are perpendicular to the axis 102. However, conical or other-shaped wall surfaces 136, 138 may also be used. The illustrated square toroidal shape for the air channel 122 is an example only. A circular toroid or a toroid formed by a revolution of some other shape may also be used.

The outer ring 112 defines a wall surface 140 opposite the wall surface 136. The wall surface 140 may be parallel to the wall surface 136 or may have a conical or other shape. The inner ring 106 defines a wall surface 142 opposite the wall surface 138. The wall surface 142 engages the cylinder roll when the adapter ring 104 is secured thereto and may therefore have a shape configured to conform to an end of the cylinder roll. In the illustrated embodiment, the wall surface 142 is an axially facing surface that is perpendicular to the axis 102. However, a conical or other-shaped wall surface 142 may also be used.

The outer ring 112 includes a peripheral wall surface 144 extending between the wall surfaces 136, 140. The inner ring 106 includes a peripheral wall surface 146. The peripheral wall surfaces 144, 146 may be cylindrical and may be identical, within manufacturing tolerances, in diameter with respect to one another and possibly to the cylindrical roll to which the adapter ring 104 secures. In other embodiments, some or all of one or both of the peripheral wall surfaces 144, 146 may conform to a cone centered on the axis 102, such as a cone with a cone angle of between 0 and 5 degrees. In the illustrated embodiment, the peripheral wall surfaces 144, 146 are cylindrical with a conical chamfer 148 at the intersection of the peripheral wall surface 144 and the wall surface 136 to facilitate guiding of a sleeve over the adapter ring 104.

The port 118 extends through the wall surface 140 of the outer ring 112 and intersects the air channel 122, such as by intersecting some or all of the cylindrical walls 128, 130 and annular walls 132, 134. The port 118 may positioned inwardly from the peripheral wall surface 146, and the fitting 120 may be sized and configured such that no portion of the fitting 120, or a pneumatic coupler secured thereto, extends outwardly from the peripheral wall surface 146 to avoid interference with a compliant sleeve that is slid over the adapter ring 104, as described below.

The peripheral outer openings 124 extend through one or both of the peripheral wall surfaces 144, 146 and intersect the air channel 122, such as by intersecting some or all of the cylindrical walls 128, 130 and annular walls 132, 134. As noted above, in the illustrated embodiment, the peripheral outer openings 124 are formed only in the inner ring 106 and extend inwardly from the peripheral wall surface 146.

In some embodiments, the inner and outer rings 106, 112 include one or more features to facilitate alignment of the inner and outer rings 106, 112 with respect to one another. In the illustrated embodiment, a cylindrical protrusion 150 on the inner ring 106 engages a cylindrical recess 152 on the outer ring 112. Other arrangements are possible, such as a protrusion formed on the outer ring 112 engaging a recess on the inner ring 106. Other registration features may also be used, such as pins engaging corresponding recesses.

Another configuration of the roll end air fitting adapter is shown in FIGS. 5, 6, 7, and 8. Various configurations of the bolt holes 108 and central openings 110, 116 may be used. In particular, the central openings 110, 116 and bolt holes 108 may have may be arranged on non-circular features of the configured to conform to bolt holt patterns and features (protrusions, air passages, etc.) of a given cylindrical roll. In the embodiment of FIGS. 5, 6, 7, and 8, the central opening 110 is non-cylindrical such that the inner ring 106 defines tabs 154 that protrude inwardly with the bolt holes 108 being formed on the tabs 154. In this illustrated embodiment, the outer ring 112 includes a cylindrical central opening 116 and does not overlap the bolt holes 108. The outer ring 112 may therefore secure to the inner ring 106 using separate fasteners, a press fit, welds, adhesive, or other type of fasteners. And, as in the previously described embodiment, the inner and outer rings 106, 112 may co-formed, such as in a casting, molding, or additive manufacturing process, so as to be two separate pieces or one monolithic component. There also may be one or more bolt hole patterns formed by the bolt holes 108 to secure to a variety of cylindrical rolls.

Again, the embodiments of the adapter ring 104 described above are examples only. The components my be configured differently or other components may be combined to achieve an arrangement of an air channel 122 coupled to peripheral outer openings 124. For example, the air channel 122 may be defined between cylindrical faces of concentric rings with the outer ring defining the peripheral outer openings 124 and air passages 126. The air channel 122 and the peripheral outer openings 124 in fluid communication therewith may be formed by a single part formed by casting, molding or additive manufacturing and possibly subject to subsequent machining steps, such as smoothing and polishing and outer cylindrical or conical surface.

Example Compliant Sleeve Application Method(s)

FIGS. 9 to 12 illustrate a method by which a compliant sleeve 160 is secured to a cylindrical roll 162 using the roll end air fitting adapter 100. The cylindrical roll 162 may be made of a conductive material, such as aluminum, steel, copper, brass, or other metal. The compliant sleeve 160 is made of a compliant and durable polymer. Silicone is one example although various other polymeric compositions may be used. As an initial step, the adapter ring 104 is secured to an end of the cylindrical roll 162. For example, bolts 166 may be passed through the bolt holes 108, 114, or just bolt holes 108 formed in tabs 154, and engage corresponding threaded holes in an internal header 164 at or recessed within the open end face of the cylindrical roll 162 and extending inwardly from the end face of the cylindrical roll 162. Securing the adapter ring 104 to the header 164 may require passing the central openings 110, 116 over one or more structures protruding from the end face of the cylindrical roll 162, such as bearing 168 mounted to the header 164 and a shaft 170 mounted to the bearing 168 and extending outwardly from the bearing 168. It will be noted that only one end of the cylindrical roll 162 is shown. The other end of the roll may be similarly configured with a bearing 168 and shaft 170, although a second roll end air fitting adapter for the other end is not needed. A ring 172 or other structure to facilitate suspension of the cylindrical roll 162 may secure to the shaft 170 at one or both ends of the cylindrical roll 162. The ring 172 may be removed from the shaft 170 following placement of the compliant sleeve 160 or remain attached.

Figure 10:
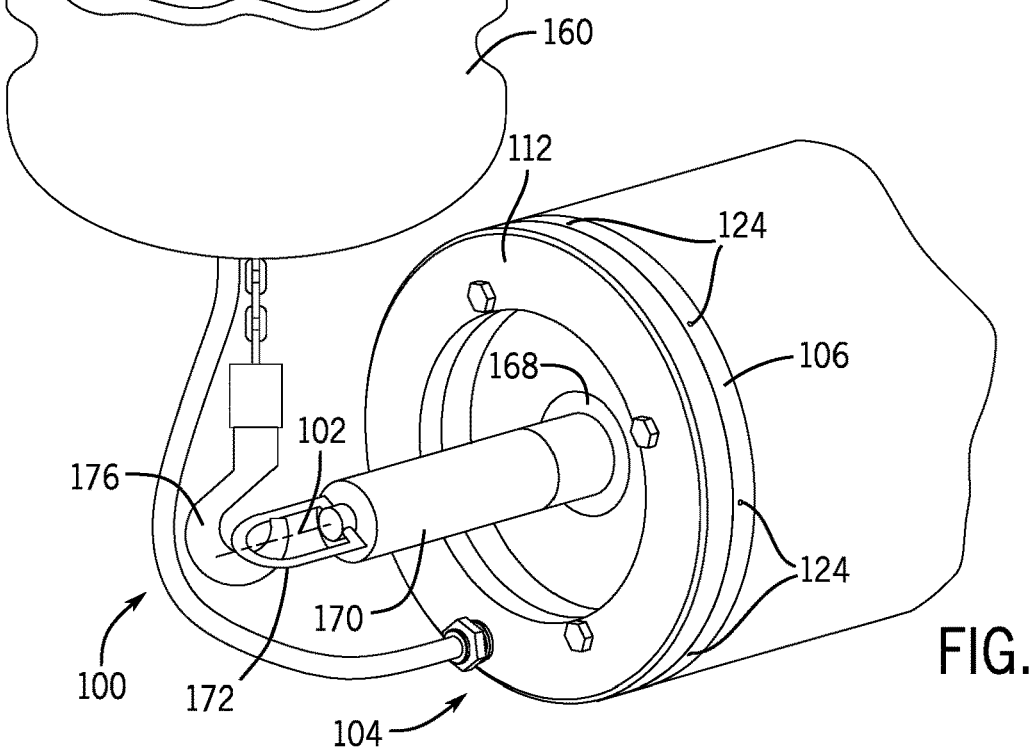

As shown in FIG. 10, a chain 174 having a hook 176 or other structure secured thereto is passed through the compliant sleeve 160 and secured to the shaft 170, such as by engaging the hook 176 with the ring 172. A pneumatic hose 178 is also passed through the compliant sleeve 160 and placed in fluid communication with the air channel 122, such as by engaging the port 118 or the fitting 120 secured to the port 118.

Figure 11:
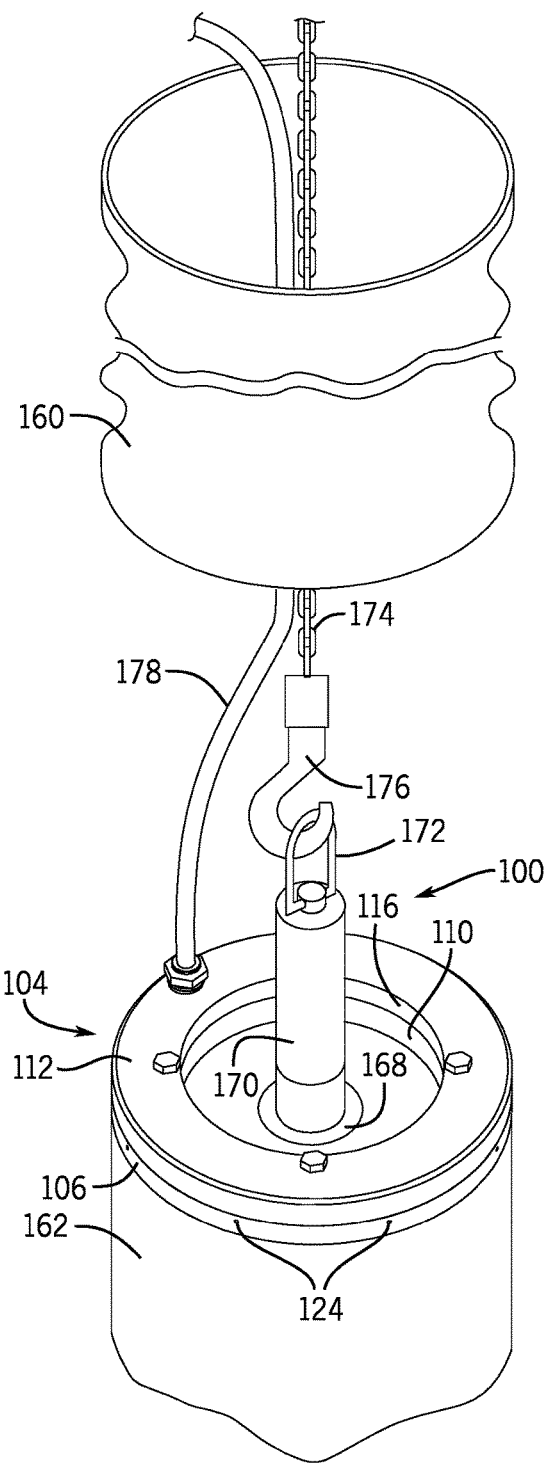
Figure 12:
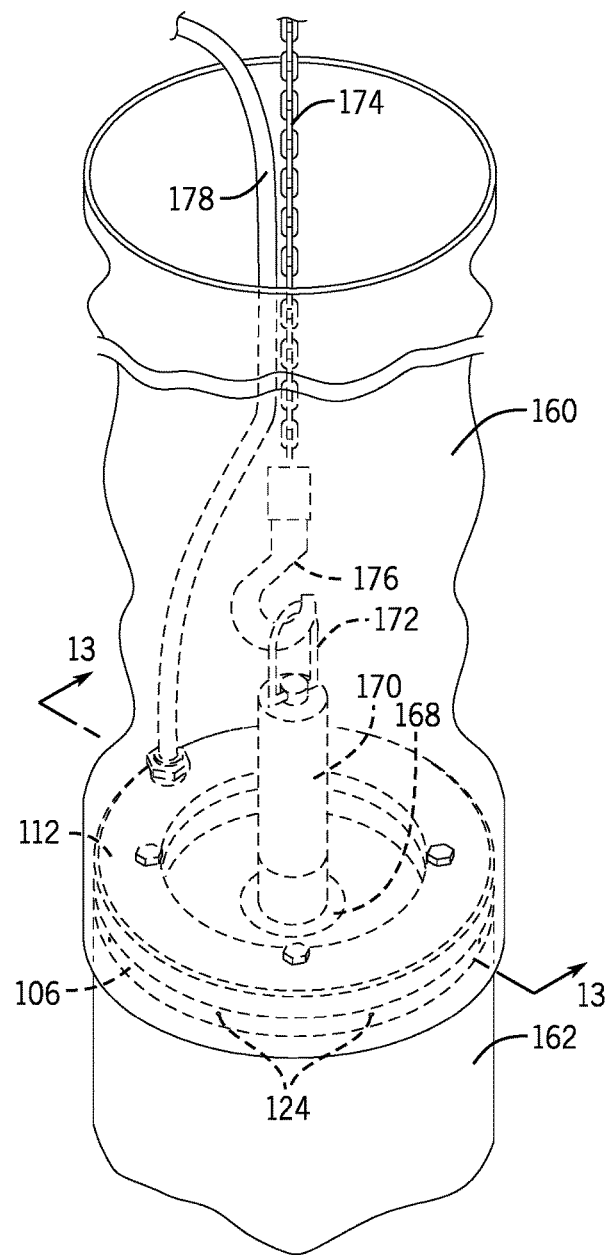
Figure 13:
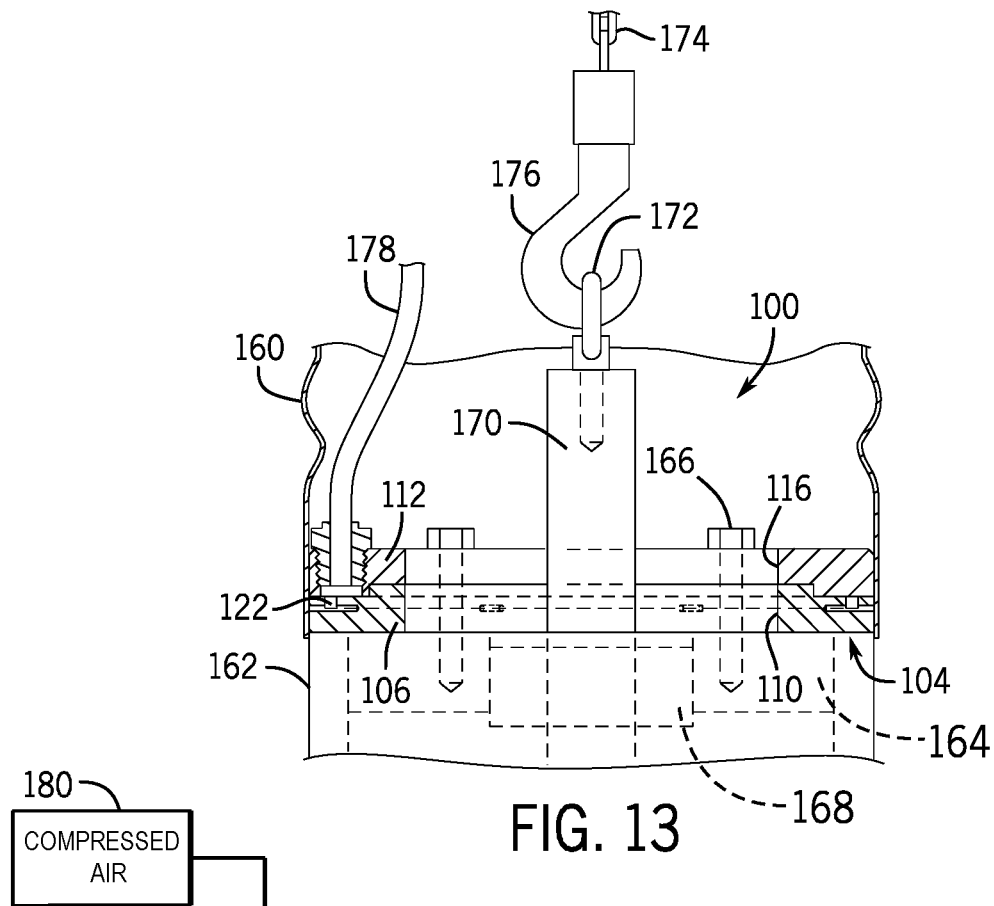

As shown in FIG. 11, the cylindrical roll 162 may then be suspended from the chain 174. As shown in FIGS. 12 and 13, the compliant sleeve 160 is slid over the adapter ring 104, such as at least over the peripheral outer openings 124, at least over the entirety of the peripheral wall surfaces 144, 146, or at least over a portion (e.g., from 1 to 5 cm) of the cylindrical roll 162. Sliding the compliant sleeve 160 over the adapter ring 104 and possibly over the cylindrical roll 162 may require some deformation of the compliant sleeve 160, such as expansion of the circumference of the compliant sleeve between 0.01C to 0.1C, where C is the circumference of the cylindrical roll 162.

Figure 14:
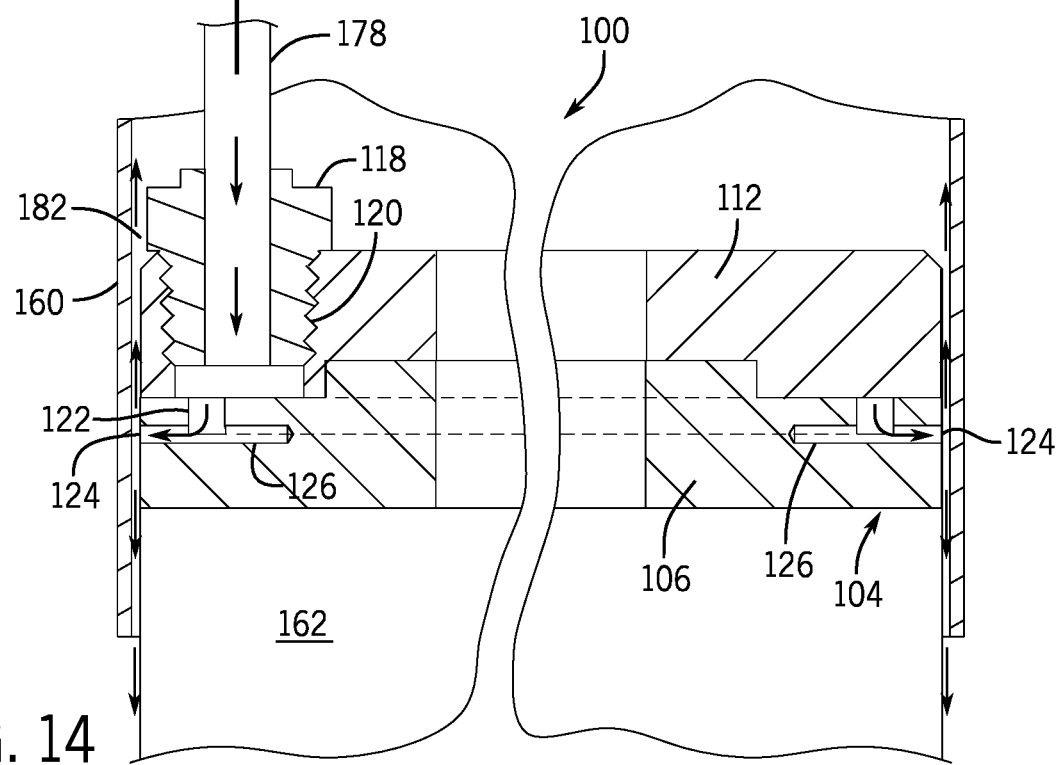

Referring to FIG. 14, compressed air 180 may be forced through the pneumatic hose 178, into the air channel 122, and out of the peripheral outer openings 124. The air forced out of the peripheral outer openings 124 creates a small air gap 182 between the adapter ring 104 and the compliant sleeve 160 and between the cylindrical roll 162 and the compliant sleeve 160. This small air gap 182 may be between 1 µm and 1 mm thick, although other thicknesses are possible. The pressure of the compressed air 180 is selected to be sufficient to create the air gap 182 of sufficient thickness to reduce friction and enable the compliant sleeve 160 to be manually slid over the cylindrical roll 162. The pressure is therefore dependent on the diameter, wall thickness, and modulus of elasticity of the compliant sleeve 160. However, a pressure of from 6 to 600 kilopascals will be suitable for many applications.

In various embodiments, the air gap 182 may extend fully (100 percent) around the circumferences of the adapter ring 104 and the cylindrical roll 162 in an annular configuration. It is possible, however, for the air gap 182 to extend only partially around these circumferences, such as localized angularly-spaced areas (e.g., three, six, nine and twelve clock positions), and still serve to facilitate applying the compliant sleeve 160 onto the cylindrical roll 162. The presence of the air gap 182 drastically reduces friction between the compliant sleeve 160 the adapter ring 104 and the cylindrical roll 162. An operator may then slide the compliant sleeve 160 over the cylindrical roll 162 until the compliant sleeve 160 is positioned substantially completely (e.g., at least 90 percent of a length of the cylindrical roll 162 along the axis 102) over the cylindrical roll 162.

With the compliant sleeve 160 positioned substantially completely over the cylindrical roll 162, the supply of compressed air 180 may be ended. The ring 172, chain 174, hook 176 and the pneumatic hose 178 may be detached. The roll end air fitting adapter 100 may then be removed from the cylindrical roll 162 or may remain attached to the cylindrical roll 162 during use.

Figure 15:
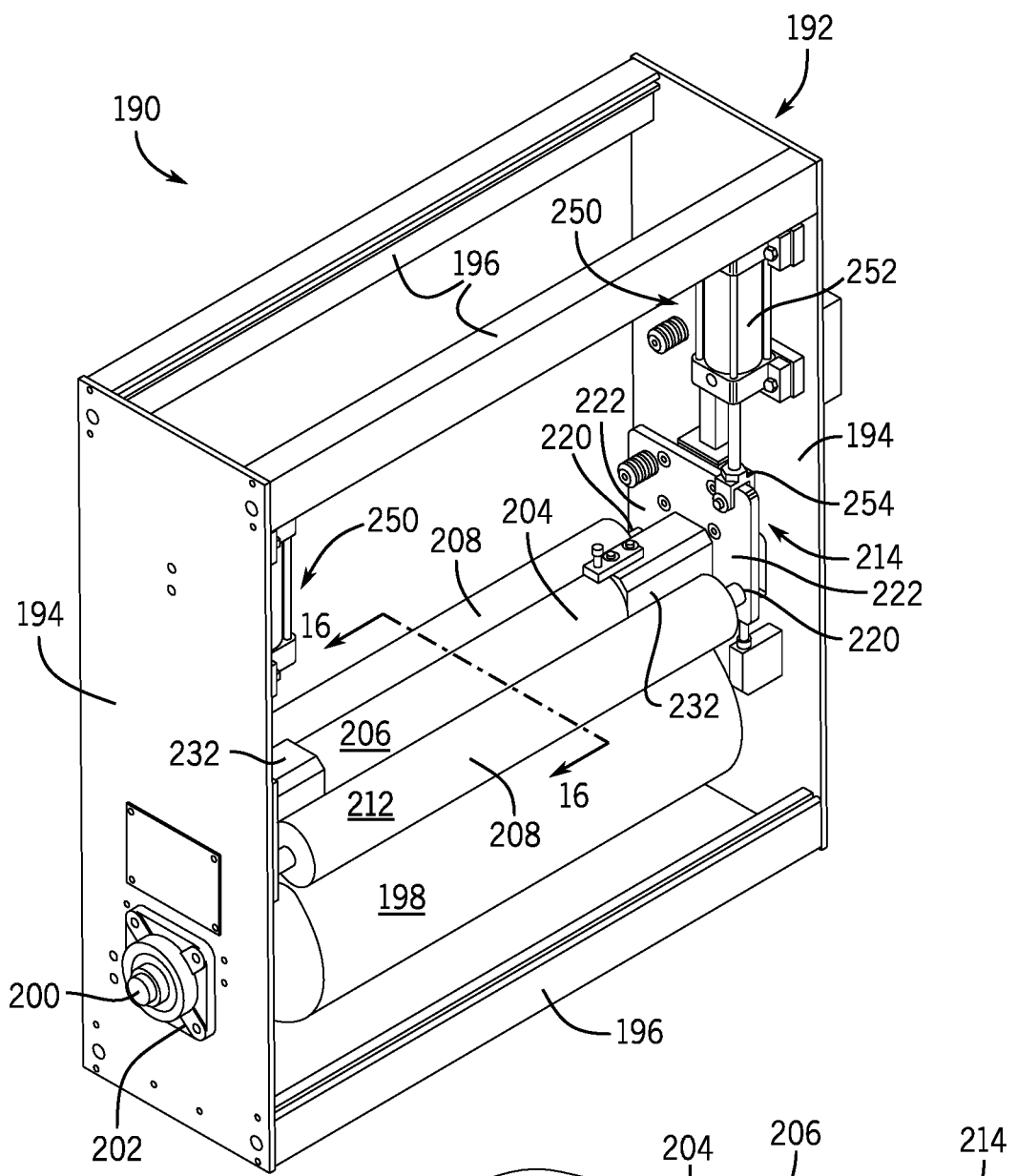
FIG. 15 is an isometric view of an example surface treater station having a cylindrical roll with a compliant sleeve applied thereto in accordance with an embodiment of the present disclosure.
Figure 16:
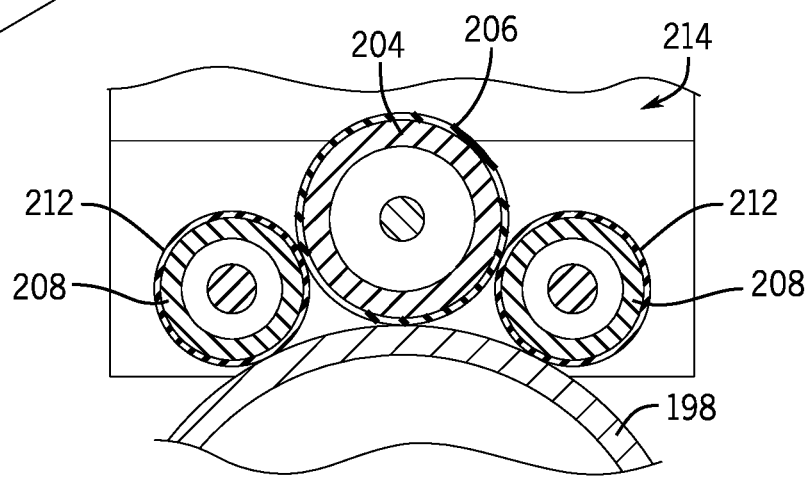
FIG. 16 is a partial sectional view taken along line 16-16 of FIG. 15.

Example Dielectric Sleeve Applied to Roller Electrode in Surface Treater Station FIGS. 15 and 16 illustrate one example application of a cylindrical roll with a compliant sleeve fitted thereto in a surface treater station 190, such as corona, chemical corona, or plasma surface treater. While an example surface treater station is described in detail herein, it will be understood that other applications that require compliant sleeve fitted onto cylinders may benefit from the roll end air fitting adapter disclosed herein.

The art of treating the surface of materials by electric discharge, including corona, chemical corona and plasma discharge, generally involves effecting a charge between electrodes, and by properly selecting certain operational parameters, such as the energization frequency and voltage, a corona or plasma discharge will occur, depending upon what process gas is present at the discharge. A high frequency power supply, such as a high voltage AC power supply operable at up to 300 kHz, may be used to effect an even more homogenous surface treatment than lower frequency plasma treatment, which will provide at least corona level treatment with the enhanced uniformity of plasma treatment. However, the specific parameters and gas/gas mixture used can be selected based on the application, such as the material composition of the article being treated. U.S. Pat. No. 6,429,595, the disclosure of which is hereby incorporated by reference in its entirety, provides a discussion of suitable gas chemistry and operational parameters of the type suitable for use with the present disclosure.

The treater station 190 may be used to treat web material, such as paper, polymer film, or other thin material, to raise the surface tension thereof in preparation for printing or other treatment. The illustrated treater station 190 is merely one example and other types and configurations of treater stations may use employed. The treater station 190 may have some or all of the attributes of the treater station described in U.S. Pat. No. 8,709,351, which is hereby incorporated herein by reference in its entirety.

The treater station 190 has a mounting frame 192 including upright supports 194 and horizontal bracing 196 at the top and bottom ends thereof. Spaced from the bottom of the treater station 190 is a backing roll 198 having a spindle 200 at both ends mounted to the upright supports 194 via journal bearings 202 (one shown) to allow for continuous free rotation with respect to the supports 194. The backing roll 198 serves to both provide the rolling support for the web material and one potential for the discharge. The backing roll 198 is a conductive cylinder, preferably made of metal such as aluminum or steel, coated with a heat resistive dielectric material layer, such as suitable ceramic.

Opposing the backing roll 198 is a roller electrode 204 which provides the other potential for the discharge. A high voltage power transformer (coupled to a remote power supply and any applicable electronics not shown) has its high voltage lead electrically coupled to the roller electrode 204 (i.e., a cylindrical roll) and its ground lead coupled to the backing roll 198 in any suitable known manner. Like the backing roll 198, the roller electrode 204 is a conductive cylinder of suitable metal, again such as aluminum or steel. The roller electrode 204 has a dielectric outer layer 206 to prevent arcing from the roller electrode 204. Two nip rollers 208 disposed on opposite feed and exit sides (respective right and left sides in FIG. 16) of the roller electrode 204 are each aligned in parallel, and in essentially tangential contact with the roller electrode 204. The nip rollers 208 can be made of non-conductive material or be made of conductive material that is covered with a non-conductive outer layer 212. When the web material is not present and the roller electrode 204 is in operating position, the nip rollers 208 also make tangential contact with the backing roll 198.

The dielectric outer layer 206 of the roller electrode 204 may be in the form of a compliant sleeve that is applied to the roller electrode 204 using the roll end air fitting adapter and method of use described above with respect to FIGS. 9-13. Again, this compliant sleeve may be a suitable high temperature polymeric material, for example silicone. The roll end air fitting adapter may be configured as shown and described with respect to FIGS. 1-8 and mounted to the end of the roller electrode 204 in the manner shown and described with respect to FIGS. 9 and 13. The roll end air fitting adapter may be mounted to the roller electrode 204 for installation of the dielectric sleeve and then removed, or it may remain mounted to the roller electrode 204 during operation of the treater station 190.

As shown in FIGS. 15 and 16, the roller electrode 204 and the nip rollers 208 are assembled to end mounts 214, which serve to mount this assembly to the treater station 190 as well as facilitate introduction of process gas while skirting the ends to confine the process gas during operation. The end mount components are preferably made of a heat resistant, non-corrosive and non-conducting material, such as a suitable fiberglass laminate or ceramic. More specifically, the ends of the nip rollers 208 are each fit into recesses 220 in mounting plates 222 (one shown).

The shafts 170 of the roller electrode 204 fit into the cylindrical openings of mounting blocks 232 extending inwardly from the center of the mounting plates 222. One of the leads (not shown) of the power supply couples to the outer surface of the roller electrode 204. Ports, such as in one or both of the mounting plates 222, enable the injection and return of inert process into a gap between the roller electrode 204 and the backing roll 198.

This entire assembly is mounted to the upright supports 194 via a pair of actuators 250, such as hydraulic or pneumatic cylinders, in which the cylinder bodies 252 are bolted to the upright supports 194 and the end mounts 214 are bolted to the movable arm 254. This provides a vertically adjustable carriage with the roller electrode 204 and nip rollers 208, which is movable with respect to the backing roll 198 for loading the web material into the treater station 190 and for setting a desired gap distance between the roller electrode 204 and the backing roll 198, which for example may range between 0.04 and 0.06 inches for some common applications. The vertical adjustment also accommodates different material thickness by varying the gap between the roller electrode 204 and backing roll 198, while maintain a constant spacing between the roller electrode 204 and the treated surface of the web material. The actuators 250 can be electronically controlled via a suitable control (not shown).

When the carriage is lowered into operational position, such as depicted in FIGS. 15 and 16, a discharge chamber is formed between the backing roll 198 at the bottom, the roller electrode 204 at the top and the nip rollers 208 at the feed and exit sides. The roller electrode 204 is offset slightly from the arc on which the nip rollers 208 are disposed to maintain the small gap distance from the web material, which is maintained regardless of web thickness by virtue of the vertically adjustable carriage. As it rotates the entire cylindrical surface area of the roller electrode 204 is used to effect discharge, however, only the part of the surface that is within the discharge chamber nearest the backing roll 198 constitutes the discharge surface of the roller electrode 204 at any point in time.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

The description of the present disclosure has been presented for purposes of illustration and description, but it is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

What is claimed is:

1. A roll end air fitting adapter mechanically couplable to an open end of a cylindrical roll extending along a roll axis, the roll end air fitting adapter comprising:
   an adapter ring including:
   an inner ring having a bolt hole pattern receiving fasteners mounting the adapter to the cylindrical roll and defining a central opening concentric with the roll axis when the adapter ring is mounted to the cylindrical roll; and
an outer ring coupled to or formed with the inner ring;
the inner ring or the outer ring defines, or the inner ring and the outer ring define, an annular air channel extending about the roll axis, the air channel is intersected by a plurality of air passages leading from the air channel through the inner ring, the outer ring or the inner ring and the outer ring to a plurality of peripheral outlet openings disposed at an outer circumferential surface of the inner ring or the outer ring, or at the outer circumferential surfaces of the inner ring and the outer ring; and
a fitting for coupling an air source to the adapter ring, the fitting received in a port of the outer ring that communicates with the air channel;
whereby, upon fitting a compliant sleeve onto the adapter ring when the adapter ring is mounted to the cylindrical roll such that an end of the compliant sleeve is disposed along the roll axis with the peripheral outlet openings between the end of the compliant sleeve and the outer ring so that the compliant sleeve overlaps the peripheral outlet openings, and supplying air from the air source to the adapter ring through the air channel and the peripheral outlet openings, the adapter ring facilitates sliding the compliant sleeve onto the cylindrical roll.

2. The roll end air fitting adapter of claim 1, wherein the air channel extends 360 degrees about the roll axis when the adapter ring is mounted to the cylindrical roll.

3. The roll end air fitting adapter of claim 2, wherein the plurality of peripheral outlet openings includes four peripheral outlet openings spaced apart 90 degrees along the outer circumferential surface of the inner ring or the outer ring or the outer circumferential surfaces of the inner ring and the outer ring.

4. The roll end air fitting adapter of claim 3, wherein the plurality of peripheral outlet openings includes eight peripheral outlet openings spaced apart 45 degrees along the outer circumferential surface of the inner ring or the outer ring or the outer circumferential surfaces of the inner ring and the outer ring.

5. The roll end air fitting adapter of claim 1, wherein the inner ring defines the air channel, the plurality of air passages and the plurality of peripheral outlet openings; and
wherein the inner ring defines concentric circular walls and an annular inner wall spanning the concentric circular walls of the air channel.

6. The roll end air fitting adapter of claim 5, wherein the outer ring is a separate ring that couples to the inner ring to define an annular outer wall of the air channel spanning the concentric circular walls.

7. The roll end air fitting adapter of claim 1, wherein the outer ring has a central opening and a bolt hole pattern aligned with the central opening and the bolt hole pattern of the inner ring; and
wherein the bolt hole pattern of the outer ring receives the fasteners mounting the adapter ring to the cylindrical roll.

8. The roll end air fitting adapter of claim 7, further including a shaft projecting along the roll axis beyond the outer ring; and
a shaft bearing mounting the shaft to the cylindrical roll and disposed within the central openings of the inner ring and the outer ring;
wherein the shaft and shaft bearing facilitate rotation of the cylindrical roll about the roll axis and wherein the adapter ring co-rotates with the cylindrical roll.

9. The roll end air fitting adapter of claim 1, wherein the cylindrical roll is a roller electrode of an ionization surface treater station; and
wherein the compliant sleeve is a cylindrical sleeve of dialectic material.

10. A method of using a roll end air fitting adapter with a cylindrical roll extending along a roll axis, the method comprising;
mounting an adapter ring to an open end of the cylindrical roll, the adapter ring including:
an inner ring having a bolt hole pattern receiving fasteners mounting the adapter ring to the cylindrical roll and defining a central opening concentric with the roll axis when the adapter ring is mounted to the cylindrical roll; and
an outer ring coupled to or formed with the inner ring;
the inner ring or the outer ring defines, or the inner ring and the outer ring define, an annular air channel extending about the roll axis, the air channel is intersected by a plurality of air passages leading from the air channel through the inner ring, the outer ring or the inner ring and the outer ring to a plurality of peripheral outlet openings disposed at an outer circumferential surface of the inner ring or the outer ring, or at the outer circumferential surfaces of the inner ring and the outer ring;
connecting an air source to a fitting that is mounted to the adapter ring and communicates with the air channel;
applying a compliant sleeve onto the adapter ring such that an end of the compliant sleeve is disposed along the roll axis with the peripheral outlet openings between the end of the compliant sleeve and the outer ring so that the compliant sleeve overlaps the peripheral outlet openings;
supplying air from the air source to the adapter ring through the air channel and out the peripheral outlet openings; and
sliding the compliant sleeve along the cylindrical roll while the air from the air source is supplied to the adapter ring.

11. The method of using a roll end air fitting adapter with a cylindrical roll of claim 10, wherein the air channel extends 360 degrees about the roll axis when the adapter ring is mounted to the cylindrical roll.

12. The method of using a roll end air fitting adapter with a cylindrical roll of claim 11, wherein the plurality of peripheral outlet openings includes four peripheral outlet openings spaced apart 90 degrees along the outer circumferential surface of the inner ring or the outer ring or the outer circumferential surfaces of the inner ring and the outer ring.

13. The method of using a roll end air fitting adapter with a cylindrical roll of claim 12, wherein the plurality of peripheral outlet openings includes eight peripheral outlet openings spaced apart 45 degrees along the outer circumferential surface of the inner ring or the outer ring or the outer circumferential surfaces of the inner ring and the outer ring.

14. The method of using a roll end air fitting adapter with a cylindrical roll of claim 10, wherein the inner ring defines the air channel, the plurality of air passages and the plurality of peripheral outlet openings; and
wherein the inner ring defines concentric circular walls and an annular inner wall spanning the concentric circular walls of the air channel.

15. The method of using a roll end air fitting adapter with a cylindrical roll of claim 14, wherein the outer ring is a separate ring that couples to the inner ring to define an annular outer wall of the air channel spanning the concentric circular walls.

16. The method of using a roll end air fitting adapter with a cylindrical roll of claim 10, wherein the outer ring has a central opening and a bolt hole pattern aligned with the central opening and the bolt hole pattern of the inner ring; and wherein the bolt hole pattern of the outer ring receives the fasteners mounting the adapter ring to the cylindrical roll.

17. The method of using a roll end air fitting adapter with a cylindrical roll of claim 16, further including:

terminating the air source from the air source after a full length of the compliant sleeve has been extended along the cylindrical roll; and disconnecting the air source form the adapter ring.

18. The method of using a roll end air fitting adapter with a cylindrical roll of claim 17, further including:

supporting the cylindrical roll by a shaft projecting along the roll axis through the central openings of the inner ring and the outer ring beyond the adapter ring and a shaft bearing mounting the shaft to a header of the cylindrical roll;

wherein the shaft and shaft bearing facilitate rotation of the cylindrical roll about the roll axis and wherein the adapter ring co-rotates with the cylindrical roll.

19. The method of using a roll end air fitting adapter with a cylindrical roll of claim 18, further comprising:

orienting the cylindrical roll in an upright position with the adapter ring at an upper end of the cylindrical roll before sliding the compliant sleeve along the cylindrical roll while the air from the air source is supplied to the adapter ring.

20. The method of using a roll end air fitting adapter with a cylindrical roll of claim 10, wherein the cylindrical roll is a roller electrode of an ionization surface treater station; and wherein the compliant sleeve is a cylindrical sleeve of dialectic material.

\* \* \* \* \*